Patented Mar. 25, 1947

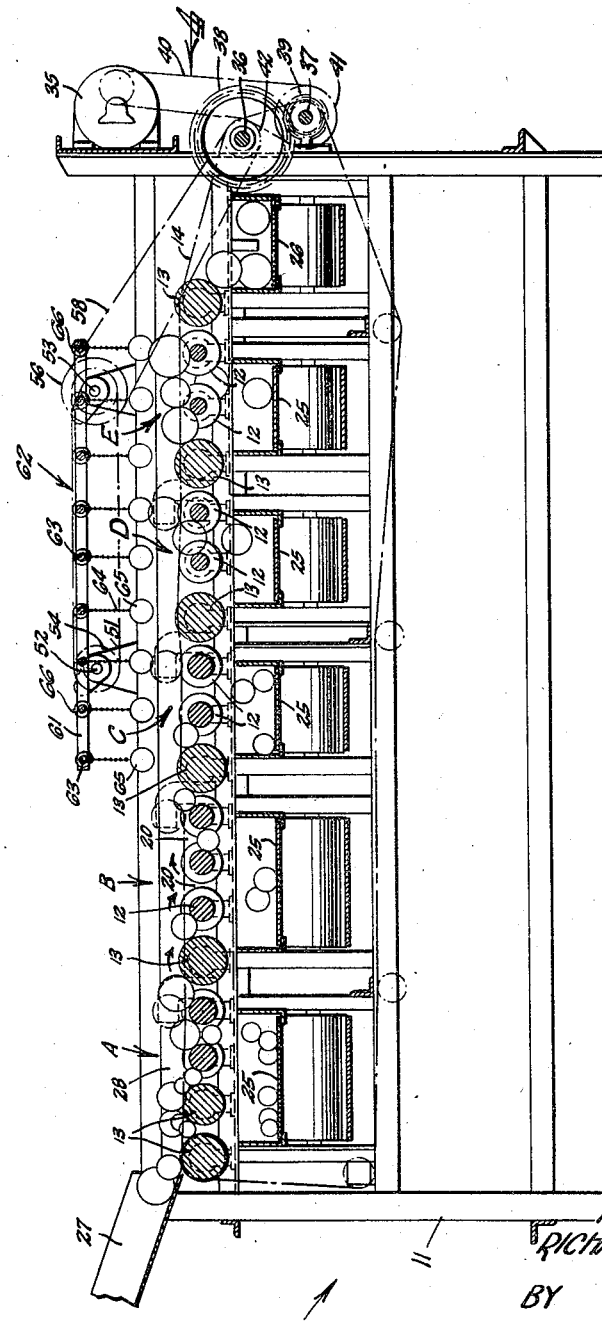

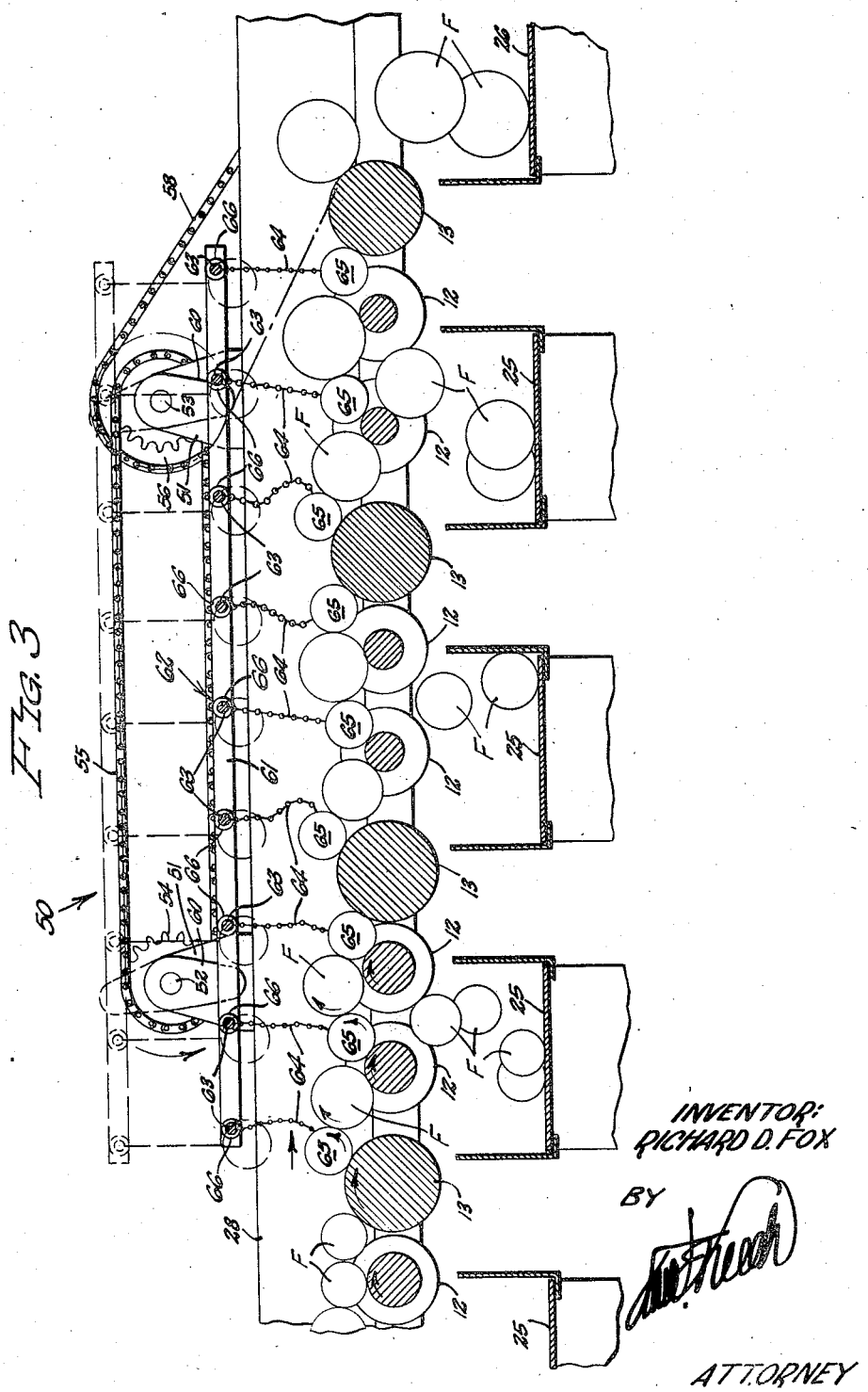

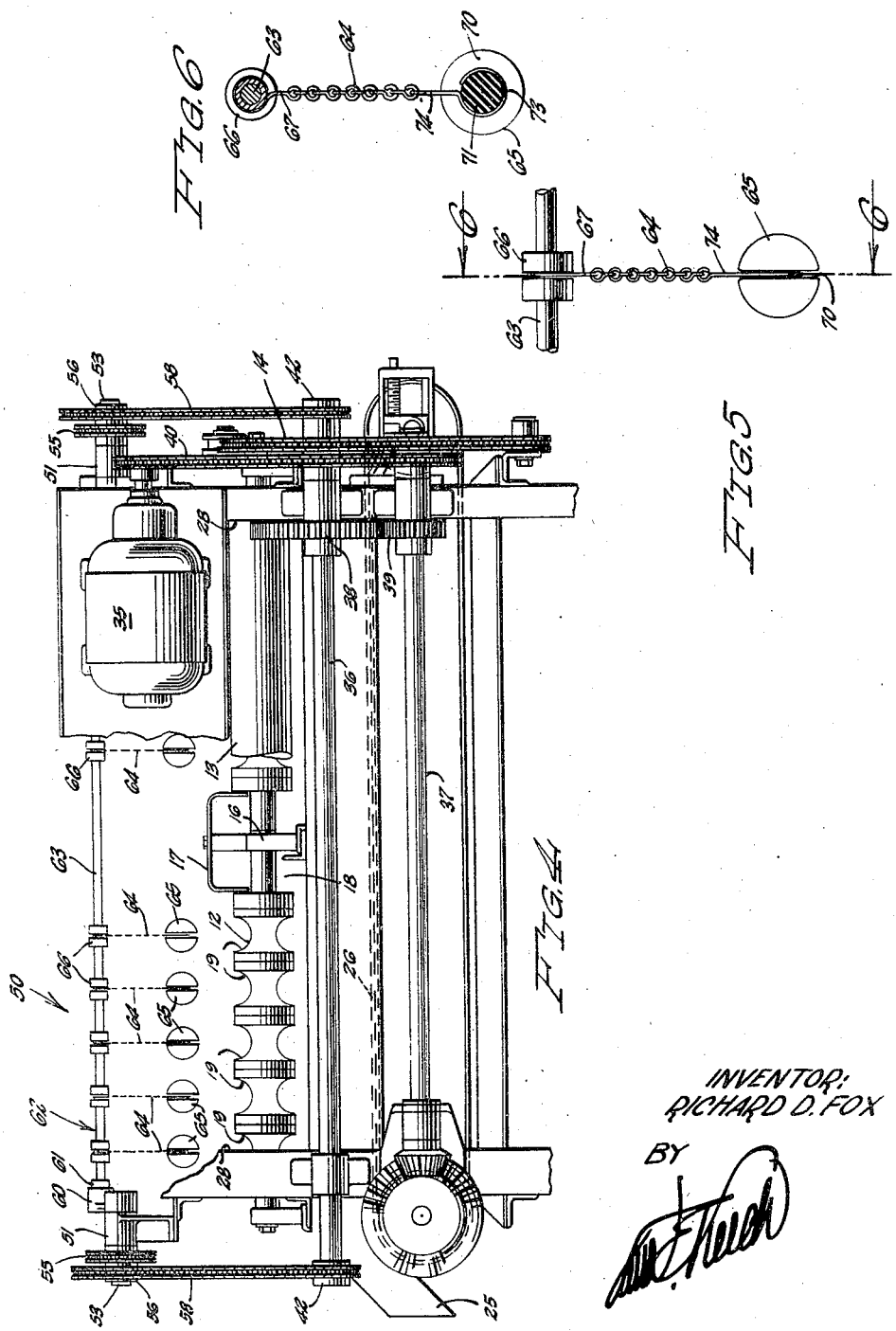

2,417,921

UNITED STATES PATENT OFFICE 2,417,921

FLEXIBLY SUSPENDED BALL MEANS FOR ADVANCING ARTICLES OVER TRANSVERSE ASSORTING ROLLERS

Richard D. Fox, San Jose, Calif., assignor to Food Machinery Corporation, San Jose, Calif., a corporation of Delaware Application February 4, 1944, Serial No. 521,078

15 Claims. (Cl. 209—106)

1

This invention relates to devices for handling rollable articles in which said articles are supported on and conveyed by a bed of transversely disposed rollers. While adapted for use with many different kinds of such devices the invention is particularly useful in connection with fruit and vegetable sizers of the general type shown in U. S. Letters Patent to H. C. Stockdale No. 2,244,546, issued June 3, 1941.

Transverse roller conveying devices are widely used in the fruit and vegetable industry for performing the various treatments by which fruit and vegetables are commercially processed before packing and shipping these to market. These conveyors are most commonly used for washing, drying, polishing and waxing the fruit. For these different uses the rotating rollers may have the form of cylindrical brushes, metal tubes or, as employed in the Stockdale sizer, these rollers may be formed of rubber with annular channels providing pockets in which the fruit is sized.

Heretofore difficulty has been experienced in sizing soft, small rollable fruit such as apricots and the like. In seeking to size these with a Stockdale type sizer I discovered that too often the fruit runs predominantly to the small sizes so that an insufficient quantity of large fruit reaches the rollers providing the larger sizing openings near the discharge end of the machine and that when this condition exists the fruit of the larger sizes is over-handled by remaining too long supported on these rolls before other fruit comes along to displace it.

It is accordingly an object of my invention to provide a transverse roller sizer suitable for handling apricots and the like which operates on the principle of the Stockdale sizer and in which the large size fruit is not over-handled from the cause aforestated.

The problem of artificially progressing rollable articles on transverse roller conveyors of various types has been hitherto solved by a large variety of progressors developed for this purpose. A number of these were tried out on a Stockdale type sizer while sizing apricots and were found to handle the fruit too roughly for these to solve the problem aforestated.

It is another object of my invention to provide a fruit progressor adaptable for use with transverse roll conveyors generally but especially useful in connection with the Stockdale type sizer.

It is also an object of my invention to provide a novel method of and apparatus for causing

2 articles to progress over a transverse roller conveyor.

The manner of accomplishing the foregoing objects, as well as further objects and advantages will be made manifest in the following description taken in connection with the accompanying drawings in which:

Fig. 2 is a longitudinal sectional view taken on the line 2—2 of Fig. 1.

Fig. 3 is an enlarged longitudinal sectional view taken on the line 3—3 of Fig. 1.

Fig. 4 is an enlarged end view taken in the direction of the arrow in Fig. 2, and partially broken away, to show normally hidden portions of the structure.

Fig. 5 is an enlarged detail view of one of the progressor balls and suspension means of the invention.

Fig. 6 is a sectional view taken on the line 6—6 of Fig. 5.

Figure 1:
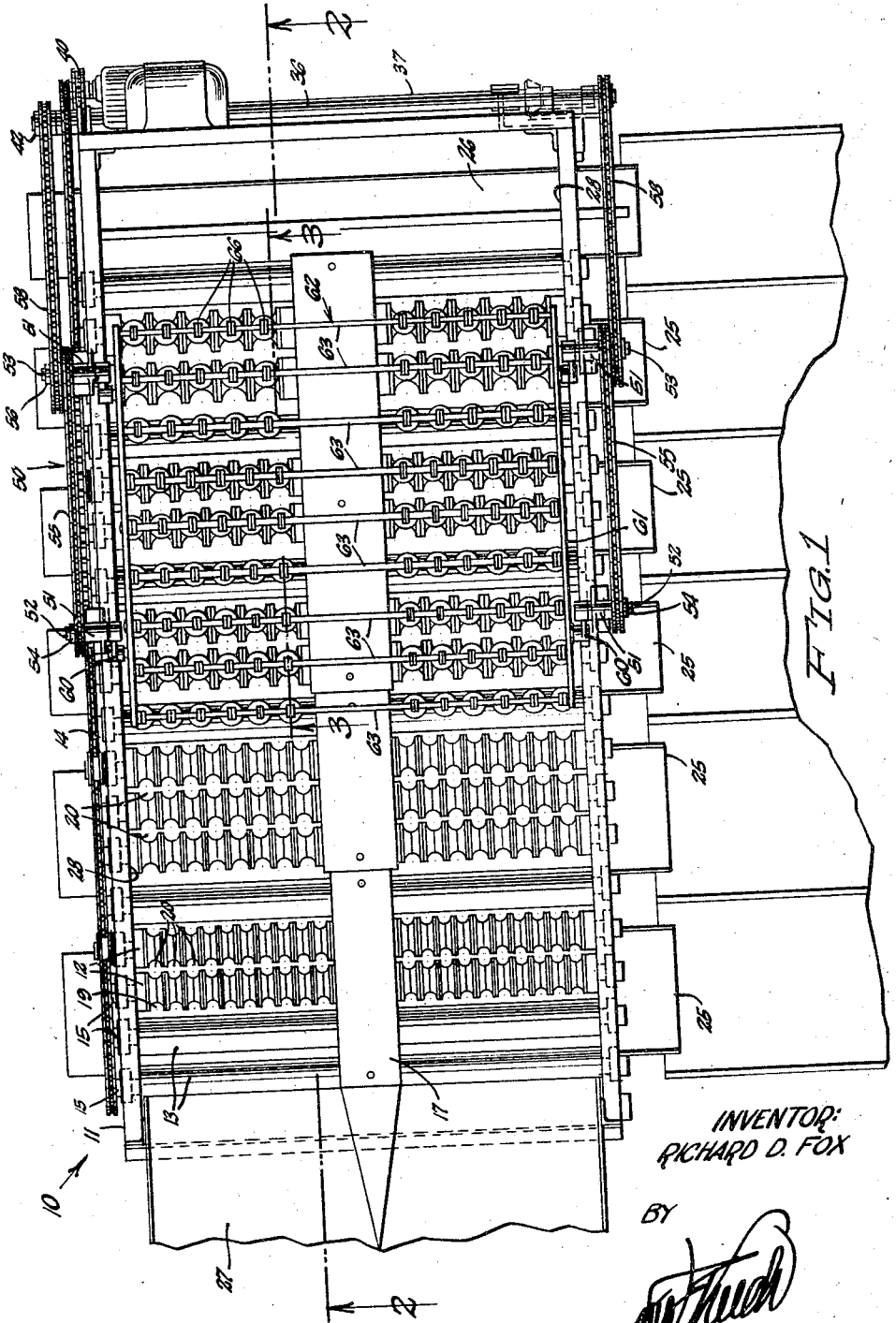
Fig. 1 is a plan view of a preferred embodiment of the invention.

Referring specifically to the drawings it is to be noted that the sizer 10, with which, for illustrative purposes, my invention is shown as associated, is a double lane fruit and vegetable sizer of the type fully illustrated and described in the Stockdale Patent No. 2,244,546. Reference is therefore had to this patent for a disclosure of those details of this type of sizer which are not specifically disclosed herein.

The sizer 10 includes a frame 11 on which are rotatably mounted successive sizing sections each including a series of sizing rolls 12, these being designated as A, B, C, D and E, there being intermediate and transfer rolls 13 also rotatably mounted on the frame 11, these rolls being located in advance of, following and in between the aforesaid sizing sections. The sizing rolls 12 and transfer rolls 13 are continuously rotated in the same direction as indicated by arrows in Figs. 2 and 3 by engagement of an endless chain 14 with suitable sprockets 15 mounted for rotation with said rolls. The rollers 12 and 13 have central bearings 16 which are covered by a septum wall 17 which extends into central recesses 18 formed in these rollers, the function of this wall being to divide the space over the rollers 12 and 13 into two lanes and increase the sizer's accuracy by providing a space for the bearings 16 to support the rollers at their mid-points.

The rollers 12 are provided with annular grooves 19 which unite in the space between a pair of such rollers to provide sizing pockets 20. The size of the grooves 19 and therefore the diameter of the sizing pockets 20, increases successively in the sizing sections A, B, C, D and E so as to progressively remove from the stream of fruit passing through the machine, those pieces of said fruit of successively larger diameters.

Mounted beneath the respective sizing sections aforesaid, are power-driven conveyor belts 25 which remove from beneath these sections, the fruit which drops downwardly through the sizing pockets 20. A similar conveyor belt 26 is provided beyond the final transfer roller 13 to receive the fruit discharged thereover and convey this from the sizer.

Fruit is fed to the sizer 10 through a chute 27 and is held from overflowing laterally from on top of the rollers 12 and 13 by side walls 28.

Power is delivered to the chain 14 from an electric motor 35 in the following manner: Shafts 36 and 37 are rotatably mounted on the frame 11 and are inter-connected to rotate in opposite directions at a fixed gear ratio by meshed gears 38 and 39 fixed on these shafts. (See Figs. 2 and 4.) The shaft 37 is rotated by a chain 40 connecting this to the motor 35. This chain engages the shaft 37 through a double sprocket 41 thereon, this sprocket also meshing with the chain 14 so as to drive the rollers 12 and 13. The shaft 36 has drive sprockets 42 provided thereon at its opposite ends.

Mounted on the frame 11 above the sizing sections C, D and E is the novel fruit progressor 50 of my invention. This progressor includes two pairs of bearings 51 mounted on top of the walls 28, these bearings carrying stub shafts 52 and 53. On the outer ends of stub shaft 52 are sprockets 54 which are connected by chains 55 to double sprockets 56 fixed on the outer ends of shaft 53. The double sprockets 56 are also connected by chains 58 to the sprockets 42 on opposite ends of the shaft 36.

Mounted on the inner ends of the stub shafts 52 and 53 are cranks 60 which are disposed in parallelism. Upon these are pivotally mounted side bars 61 of a ball-supporting frame 62. The frame is completed by cross rods 63 which connect the bars 61. Suspended individually from each of the rods 63 upon flexible chains 64 is a string of balls 65. The rods 63 are spaced apart substantially equidistant to the spacing of the centers of the rolls 12 and 13 which are disposed beneath the progressor 50. As these rods are parallel with these rollers, each string of the balls 65 thus suspended is also parallel with said rollers. While it is optional as to just how the chains 64 are attached to the rods 63 and to the balls 65, the preferred manner of accomplishing this is illustrated in Figs. 5 and 6. Here it is seen each rod 63 is provided with grooved collars 66, a wire 67 being wrapped around the collar in its groove to form an eye and its lower end connected to one of the chains 64. An equally satisfactory connection has been made by drilling holes through the rod 63 and connecting the chains 64 to cotter keys inserted upwardly through these holes with the cotters' ends spread and wrapped downwardly about the rod.

The preferable manner of connecting the lower ends of the chains 64 to the balls 65 is shown in Figs. 5 and 6. In this construction each ball 65 has an annular groove 70 formed therein in a medial plane so as to leave opposite halves of the ball connected by a cylindrical neck 71. A wire eye 73 lies in the groove 70 and loosely surrounds the neck 71 so that the latter is rotatable therein, this eye having a stem 74 which extends out of the groove 70 and connects to the lower end of the chain 64.

For the purposes of the invention it is desirable that the surfaces of the balls 65 have a high frictional coefficient and I therefore prefer that these balls be made of yieldable rubber or an equivalent material. However, these balls may satisfactorily perform their function if made of other materials such as wood or plastic. The balls 65 may also satisfactorily perform their function under some circumstances if they are made as perfect spheres, each provided with a small screw eye screwed into the ball right up to the eye itself and the latter connected to the lowermost link of the chain 64.

As described in the above noted Stockdale patent, the sizing rollers 12 of the sizer 10 have their outer surfaces formed of soft, yieldable rubber and the faces of the annular grooves 19 formed therein are provided with resilient spurs or bristles which are preferably cast integral with the said rubber material.

Operation

The sizer 10, although formed of two sizing lanes, functions to size rollable fruit fed thereto in substantially the same manner as the sizer disclosed in the Stockdale patent. In this operation fruit is fed from the chute 27 and over the first two transfer rollers 13 and thence over sizing sections A and B which remove two of the smaller fractions as shown in Fig. 2. The balance of the fruit is then transferred to sizing section C. In passing through the sizer 10 up to this point each piece of fruit while supported in any valley formed between two of the rollers 12 and 13 remains thus supported until contacted by another piece of fruit being fed into that valley. In the first two sizing sections there is an ample quantity of fruit progressing from valley to valley so that ordinarily no piece of fruit is overhandled by remaining too long in any given valley.

In handling certain kinds of fruit, such as apricots, it frequently happens that a sufficient portion of the entire volume of fruit fed over the machine is eliminated in sizing sections A and B so that the remainder of the fruit delivered to sizing sections C, D and E is insufficient in volume to prevent such over-handling. This difficulty is eliminated in my invention by my novel fruit progressor 50 in the following manner.

The cranks 60 and the frame 62 supported thereon are rotated by the chains 58 and 55 in a reverse direction to the direction in which the rollers 12 and 13 are rotated by the chain 14. This results in the balls 65 being lowered with each rotation of the frame 62 until each transverse row of the balls 65 comes to rest on the fruit or on one of the rollers 12 or 13 as shown in Fig. 3. For a moment each of these balls is so positioned as to engage not only this roller but a piece of fruit F which may be resting and rotating in the pocket 20 just in advance of the roller contacted by this ball. The ball thus contacting both a roller and a piece of fruit causes the point on the fruit contacted by this ball to cease rotating downwardly and starts it rotating upwardly so that this piece of fruit is lifted from said pocket and expelled forwardly over the roller just in advance thereof.

As there is a transverse row of balls 65 for each of the rollers 12 and 13 in the sizing sections C, D and E, each of the pieces of fruit resting in pockets 20 or in one of the valleys between a roller 13 and an adjacent roller 12 in these sections, is thus shifted across the next adjacent roller 12 or 13 into the valley immediately there-beyond.

As the rotation of the frame 62 proceds, the balls 65 are drawn forwardly by their chains 64 and then lifted upwardly out of contact with the rollers 12 and 13 and the fruit resting thereon. The frame 62 then swings these balls backward and downward again so as to repeat the progressor action just described.

In the sizer 10 it is to be noted that in the sizing sections C, D and E, there is a ball 65 provided opposite each of the annular channels opening into the valleys between the rollers 12 and 13. The progressor 50 functions especially well where the fruit is prevented from shifting transversely by virtue of its resting in one of the grooves 19. This makes contact of one of the balls 65 with such a piece of fruit immediately effective in causing this piece of fruit to progress into the next valley.

The action of the balls 65 is also assisted by the presence of grooves 19 in a roller 12 disposed beneath a string of the balls 65 as these are lowered and where the next roller is one of the rollers 13 which is substantially cylindrical in shape. In this situation the balls 65 are held against being displaced transversely of the direction of travel of the fruit by being temporarily confined within the respective grooves 19 of said roller 12, and the maintenance of the balls 65 in this string against being displaced transversely after they engage the fruit between this roller and said roller 13, causes these balls to cooperate in pushing fruit in the valley between these rollers upwardly over said cylindrical roller 13. As pointed out in the Stockdale patent, the cylindrical rollers preferably have their outer surface provided with a multiplicity of spurs or bristles such as are provided in the inner surfaces of the grooves 19, yet the rollers 13 do not have anything corresponding to the grooves 19 which would guide the fruit to prevent its shifting laterally out from directly in front of one of the balls 65 engaging the same.

It is contemplated that when the progressor 50 is combined with a transverse rotating roller conveyor in which none of the rollers are provided with grooves for canalizing the movement of the fruit, the strings of balls 65 will be arranged so that the balls are practically in contact with each other in each string so as to propel fruit in a valley in which this string operates over the next roller and into the next valley even though there be only one or a small number of scattered pieces of fruit in this valley. It is thus seen that the progressor 50 is not limited to operation in connection with such a conveyor in which the rollers are provided with annular grooves, but is adapted to be applied in progressing rollable objects being conveyed on transverse rotating roller conveyors generally.

It is to be noted that each ball 65 when supported by the preferred construction illustrated in Figs. 5 and 6 has the axis of the neck 71 thereof disposed parallel with the roller which it contacts when it is lowered in the normal functioning of the progressor 50. The ball 65 thus tends to rotate about the axis of the neck 71 and continues to rotate about this axis in performing its function in pushing a piece of fruit out of the valley in advance of said roller and over the next roller into the next valley.

If the balls 65 were to be suspended in the alternative manner, heretofore suggested, by the lower link in the chain 64 connecting to an eye sunk in the ball flush with the surface thereof, then each ball 65 would tend to be turned until the eye therein for connecting it to the chain 64 is disposed toward the axis of the ball lying parallel with the roller contacted by the ball before the ball would assume a simple rolling contact with this roller in the performance of its function.

The mode of operation of each of the balls 65 in lifting and propelling a piece of fruit F from one valley to the next is clearly shown in Fig. 3. Here it is seen that no matter how the chains 64 are connected to the balls 65, these chains slacken when the balls suspended thereon momentarily come to rest and are supported on the rollers 12 and 13 and on the fruit F. For a fraction of a second each of the balls 65 thus rests in freely rotatable contact with the roller and piece of fruit F supporting said ball.

This freedom is limited by the connection of the balls 65 to the chains 64 but it is adequate to permit each ball 65 to be rotated by the roller on which it is resting, this rotation being transmitted through the ball 65 to the fruit F which the ball is also resting against, said ball thereby cooperating with the next roller in advance to lift this fruit rapidly out of the valley it had been rotating in before it was contacted by said ball.

The action just described is shown as taking place in Fig. 3 with respect to each of the pieces of fruit F supported by the rollers 12 and 13 below the fruit progressor 50 of my invention.

Reference to the balls 65 being lowered into "freely rotatable" contact with the rollers 12 and 13 and fruit F is not to be interpreted as meaning absolute freedom of rotation because the freedom of the balls 65 to rotate is necessarily restricted by connection of the chains 64 thereto. Furthermore, freedom of the balls 65 to rotate, to this restricted degree even, is limited to the short periods when the frame 62 is disposed downward.

While the elements 65 have been described and are designated in the claims by the term "ball," it is to be understood that these do not have to be spherical in order to accomplish their purpose. It is preferable, of course, that they be spherical but it is desired that the term "ball" be construed broadly to cover any suitably shaped individual rollable element capable of performing according to the general mode of operation of the invention.

It is also desired to note that where the term "chain" is used to designate the flexible tethering element 64 which supports the balls 65, this term is not used in a specific sense. While a link chain is preferable for this tethering element, it might also be made of filamentary flexible material such as a cord, a string, or a piece of tape.

Although for practical purposes in sizing apricots it is unnecessary to have the progressor mechanism extend over the first two sizing sections of the machine, it is to be understood that in some cases it may be desirable to have the progressor mechanism operate over all of the valleys of the machine. This would be the case where the progressor mechanism of my invention were to be used in a transverse rotating roller machine and where it is desirable to have the progressor mechanism clean out or eliminate all of the fruit in the machine at the end of the running of a given lot of fruit. This is practiced, for instance, in the citrus industry where a large portion of the fruit packed is washed, dried and polished by the action thereon of transverse rotating brush rolls while the fruit is being fed thereover.

I claim:

1. In a conveyor for rollable articles having transverse rotating rollers forming valleys for supporting and rotating said articles, the combination of: a series of balls; and means for flexibly suspending said balls over said rollers and periodically bringing said balls downwardly into freely rotatable contact with said rollers and said articles carried thereon and then lifting said balls upwardly out of contact with said rollers.

2. In a conveyor for rollable articles having transverse rotating rollers forming valleys for supporting and rotating said articles, the combination of: a plurality of balls disposed in rows parallel with said valleys; a frame disposed above said balls; means for flexibly suspending said balls from said frame; and means regularly shifting said frame over a path which lowers said balls downwardly into freely rotatable contact with said rollers and objects supported in valleys formed by said rollers on the sides thereof towards which the upper surfaces of said rollers are moving and then lifting said balls out of contact with said rollers.

3. In a conveyor for rollable articles having transverse rotating rollers forming valleys for supporting and rotating said articles, the combination of: a plurality of balls disposed in rows parallel with said valleys; a frame disposed above said balls, means for flexibly suspending said balls from said frame; and means for rotating said frame to automatically lower said balls into freely rotatable contact with said rollers and objects supported in valleys formed by said rollers on the sides thereof towards which the upper surfaces of said rollers are moving and then lifting said balls out of contact with said rollers.

4. In a conveyor for rollable articles having transverse rotating rollers forming valleys for supporting and rotating said articles, the combination of: a plurality of balls disposed in rows parallel with said valleys; a frame disposed above said balls; chains for flexibly suspending said balls from said frame; and means regularly shifting said frame over a path which lowers said balls downwardly into freely rotatable contact with said rollers and objects supported in valleys formed by said rollers on the sides thereof towards which the upper surfaces of said rollers are moving and then lifting said balls out of contact with said rollers.

5. In a conveyor for rollable articles having transverse rotating rollers forming valleys for supporting and rotating said articles, the combination of: a plurality of balls disposed in rows parallel with said valleys; a frame disposed above said balls; chains for flexibly suspending said balls from said frame; and means for rotating said frame to automatically lower said balls into freely rotatable contact with said rollers and objects supported in valleys formed by said rollers on the sides thereof towards which the upper surfaces of said rollers are moving and then lifting said balls out of contact with said rollers.

6. In a conveyor for rollable articles having transverse rotating rollers forming valleys for supporting and rotating said articles, the combination of: a plurality of balls arranged in rows one row for each of said rollers said balls being disposed in lines parallel with said rollers and spaced apart substantially the spacing of said rollers; and means for flexibly supporting said balls and simultaneously lowering the same each row coming into freely rotatable contact with one of said rollers and then crossing the valley disposed therefrom in the direction the upper surface of said roller travels, and then lifting said balls upwardly away from said rollers and articles, said means repeating said action at regular intervals.

7. In a conveyor for rollable articles having transverse rotating rollers forming valleys for supporting and rotating said articles, the combination of: a series of balls; and means for flexibly supporting the same above said conveyor and at regular intervals lowering the same downwardly into freely rotatable contact with said rollers and articles and then lifting said balls upwardly.

8. In a transverse rotating roller sizer in which said rollers are provided with annular grooves which unite to form sizing pockets between adjacent rollers, the combination of: a series of progressor balls disposed above said sizer; means for flexibly supporting said balls and at concurrent intervals lowering said balls into freely rotatable contact with said rollers and articles being supported thereby and then lifting said balls upwardly out of contact therewith.

9. In a transverse rotating roller sizer in which said rollers are provided with annular grooves which unite to form sizing pockets between adjacent rollers, the combination of: a series of progressor balls one of which is provided for each of said pockets; and means for flexibly suspending said balls substantially parallel with each transverse row of pockets and with each ball aligned longitudinally with its respective pocket and at regular intervals lowering said balls into freely rotatable contact with the rollers adjacent said pockets and articles supported in said pockets and then lifting said balls out of contact with the rollers of said sizer and the articles carried thereon.

10. In a conveyor for rollable articles having transverse rotating rollers forming valleys for supporting and rotating said articles, the combination of: a ball; a chain suspending said ball over said conveyor; and means for lowering said chain to bring said ball into contact with one of said rollers and one of said articles whereby said ball receives an impulse from said roller and transmits this to said article to assist the latter to progress over said conveyor.

11. In a conveyor for rollable articles having transverse rotating rollers forming valleys for supporting and rotating said articles, the combination of: a ball; a chain suspending said ball over said conveyor; and means for periodically lowering said chain to bring said ball into contact with one of said rollers and one of said articles whereby said ball receives an impulse from said roller and transmits this to said article to assist the latter to progress over said conveyor, and then lifting said chain to position said ball for a repetition of said progressor action.

12. In a conveyor for rollable articles having transverse rotating rollers forming valleys for supporting and rotating said articles, the combination of: a ball; a chain for suspending said ball over said conveyor; and means for periodically lowering said chain to lower said ball into contact with one of said rollers the upper surface of which moves towards an adjacent valley, one of the rollers forming said valley having an annular groove in the plane of said ball, which groove positions an article in said plane, said ball receiving an impulse from the roller contacted thereby, and transmitting said impulse to an article located in said valley in said plane to cause said article to be lifted from said valley and propelled into the next valley of said conveyor.

13. In a conveyor for rollable articles having transverse rotating rollers forming valleys for supporting and rotating said articles, the combination of: a series of balls; and means for tethering said balls with the latter resting on said rollers and free to receive impulses from said rollers and transmit these to said articles to assist the latter to progress over said conveyor.

14. In a conveyor for rollable articles having transverse rotating rollers forming valleys for supporting and rotating said articles, the combination of: a series of balls; means for tethering said balls with the latter resting on said rollers and free to receive impulses from said rollers and transmit these to said articles to assist the latter to progress over said conveyor; and means operating through said tethering means for periodically restoring said balls to suitable initial positions for receiving and imparting impulses as aforesaid.

15. In a conveyor for rollable articles having transverse rotating rollers forming valleys for supporting and rotating said articles, the combination of: a series of balls; means for tethering said balls with the latter resting on said rollers and free to receive impulses from said rollers and transmit these to said articles to assist the latter to progress in a given direction along said conveyor; and means for successively slackening said tethering means, to permit said balls to themselves progress with said articles along said conveyor, and then returning said balls in the opposite direction to positions for recommencing said progressor action by pulling on said tethering means.

RICHARD D. FOX.

REFERENCES CITED

The following references are of record in the file of this patent:

UNITED STATES PATENTS

| Number | Name | Date |
|---|---|---|
| 1,954,654 | Stebler | Apr. 10, 1934 |
| 1,997,044 | Cutler | Apr. 9, 1935 |
| 1,683,957 | Clouse | Sept. 11, 1928 |
| 2,318,976 | Stevens | May 11, 1943 |